US012654129B1

(12) United States Patent　(10) Patent No.: US 12,654,129 B1
Yin et al.　(45) Date of Patent: Jun. 16, 2026

(54) INTELLIGENT TREATMENT DEVICE FOR DOWNHOLE GAS INVASION WHILE DRILLING

(71) Applicant: Chengdu University of Technology, Chengdu (CN)

(72) Inventors: Fei Yin, Chengdu (CN); Changyou Li, Chengdu (CN); Hao He, Chengdu (CN); Pan Zeng, Chengdu (CN); Gan Huang, Chengdu (CN); Pengju Ye, Chengdu (CN)

(73) Assignee: Chengdu University of Technology, Chengdu (CN)

( * ) Notice: Subject to any disclaimer, the term of this patent is extended or adjusted under 35 U.S.C. 154(b) by 0 days.

(21) Appl. No.: 19/403,330

(22) Filed: Nov. 28, 2025

(30) Foreign Application Priority Data

Dec. 12, 2024　(CN) .......................... 202411823541.4

(51) Int. Cl.
| | |
|---|---|
| *E21B 49/08* | (2006.01) |
| *B01D 53/04* | (2006.01) |
| *B01D 53/22* | (2006.01) |
| *B01D 53/26* | (2006.01) |
| *B01D 53/30* | (2006.01) |
| *B01D 53/52* | (2006.01) |
| *B01D 53/78* | (2006.01) |
| *B01D 71/70* | (2006.01) |

(52) U.S. Cl.
CPC ......... *B01D 53/30* (2013.01); *B01D 53/0407* (2013.01); *B01D 53/0454* (2013.01); *B01D 53/229* (2013.01); *B01D 53/261* (2013.01);

*B01D 53/52* (2013.01); *B01D 53/78* (2013.01); *B01D 71/701* (2022.08); *E21B 49/081* (2013.01); *B01D 2253/102* (2013.01); *B01D 2257/304* (2013.01); *B01D 2257/702* (2013.01)

(58) Field of Classification Search
CPC ...................................................... E21B 49/081
See application file for complete search history.

(56) References Cited

U.S. PATENT DOCUMENTS

| | | | |
|---|---|---|---|
| 2012/0145400 A1* | 6/2012 | Harrison | ................. E21B 49/10 166/305.1 |
| 2014/0239168 A1* | 8/2014 | Wang | ...................... E21B 49/08 250/269.1 |

(Continued)

*Primary Examiner* — William D Hutton, Jr.
(74) *Attorney, Agent, or Firm* — Bayramoglu Law Offices LLC

(57) ABSTRACT

Provided is an intelligent treatment device for downhole gas invasion while drilling, including a drill string, where an inner end of the drill string close to a drill bit is provided with a gas collection chamber, a gas detection chamber, and a gas treatment chamber that are sealed and connected in sequence from bottom to top via gas pipes. The gas detection chamber utilizes a water displacement method to expel an invading gas and generate a large pressure difference, and a hydrophobic and gas-permeable semi-permeable membrane collects the invading gas. Hydrocarbons and hydrogen sulfide in the invading gas are detected by infrared light and ultraviolet light, respectively. An optical lens assembly provides an extended optical path for gas detection, which effectively improves detection accuracy. Hydrogen sulfide is absorbed by an alkaline solution in the gas treatment chamber, and hydrocarbons are adsorbed by an active solid.

14 Claims, 4 Drawing Sheets

(56)                    References Cited

U.S. PATENT DOCUMENTS

2014/0352397 A1 *  12/2014  Smits ................. G01N 33/0006
                                                          73/1.02
2015/0361791 A1 *  12/2015  Gisolf ................... E21B 49/008
                                                          166/264
2022/0317001 A1 *  10/2022  Jamison ................ E21B 49/088

* cited by examiner 4210   4209   4205         4206   4207

4212

4211                                              4208

4213

4215                                              4201

4217

4202   4214         4216   4204   4203         43

INTELLIGENT TREATMENT DEVICE FOR DOWNHOLE GAS INVASION WHILE DRILLING

CROSS-REFERENCE TO THE RELATED APPLICATIONS

This application is based upon and claims priority to Chinese Patent Application No. 202411823541.4, filed on Dec. 12, 2024, the entire contents of which are incorporated herein by reference.

TECHNICAL FIELD

The present disclosure belongs to the technical field of drilling, and particularly relates to an intelligent treatment device for downhole gas invasion while drilling.

BACKGROUND

Gas invasion refers to a phenomenon in oilfield drilling where gas from a formation invades the borehole, causing a decrease in the density of drilling fluid, which can easily lead to accidents such as overflow and blowout. The invading gas mainly includes hydrogen sulfide and hydrocarbons. Among them, hydrogen sulfide is extremely harmful to the human body. Therefore, early treatment of downhole gas invasion can effectively avoid such accidents.

Currently, the invading gas cannot be effectively collected, detected or treated after gas invasion occurs. Therefore, there is an urgent need for an integrated device for collecting, detecting, and treating the invading gas after gas invasion occurs.

SUMMARY

In view of the above-mentioned deficiencies in the prior art, a technical problem to be solved by the present disclosure is to provide an intelligent treatment device for downhole gas invasion while drilling. The present disclosure can collect, detect, and treat an invading gas when gas invasion occurs, greatly improving the accuracy and real-time performance of gas content detection.

The present disclosure adopts the following technical solution. An intelligent treatment device for downhole gas invasion while drilling includes: a drill string, where an inner end of the drill string close to a drill bit is provided with a gas collection chamber, a gas detection chamber, and a gas treatment chamber that are sealed and connected in sequence from bottom to top via gas pipes;

a side wall of the gas collection chamber coincides with a side wall of the drill string and is provided with an inlet window; the inlet window is covered with a gas-permeable and hydrophobic semi-permeable membrane; a liquid level sensor and a collection chamber pressure sensor are disposed at an inner upper part of the gas collection chamber; a water storage chamber is disposed below the gas collection chamber in the drill string; and the water storage chamber is connected to the gas collection chamber via a water pump and a liquid valve;

the gas pipe between a top of the gas collection chamber and a bottom of the gas detection chamber is provided with a gas check valve; an optical lens assembly is disposed at an inner middle part of the gas detection chamber; a light emitter is disposed below the optical lens assembly, and a light detector is disposed above the optical lens assembly; light emitted by the light emitter passes through the optical lens assembly and is received by the light detector; the light emitter and the light detector are respectively connected to light converters; and a side of the gas detection chamber includes a lower part provided with a detection chamber temperature compensator and an upper part provided with a detection chamber temperature sensor and a detection chamber pressure sensor;

the gas pipe between a top of the gas detection chamber and a bottom of the gas treatment chamber is provided with a gas pump and a gas check valve; and a hydrogen sulfide treatment chamber and a hydrocarbon treatment chamber are disposed in sequence from bottom to top in the gas treatment chamber;

a side of the hydrogen sulfide treatment chamber is provided with an inlet pipe; the inlet pipe includes an inlet end communicating with a tail end of the gas pipe and an outlet end connected to a U-shaped pipe; the U-shaped pipe is filled with an alkaline solution; an end of the U-shaped pipe away from the inlet pipe is connected to a drying pipe; the drying pipe is filled with a gas desiccant; an end of the drying pipe away from the U-shaped pipe is connected to a connecting gas pipe; and an end of the connecting gas pipe away from the drying pipe extends out of the hydrogen sulfide treatment chamber and extends into the hydrocarbon treatment chamber;

the hydrocarbon treatment chamber is internally provided with a treatment passage and a discharge cavity; an outlet end of the connecting gas pipe extends into the treatment passage and is located at a bottom of an end of the treatment passage; a bottom surface of the treatment passage is provided with a conveyor belt; an adsorption temperature compensator is disposed below the conveyor belt; an adsorption temperature sensor and an adsorption pressure sensor are disposed on an inner top of the treatment passage; a top surface of the treatment passage is provided with an adsorption solid storage cavity; a bottom of the adsorption solid storage cavity is provided with an openable storage door communicating with an interior of the treatment passage; an end of the treatment passage close to a tail end of the conveyor belt is connected to the discharge cavity, and a connection position is provided with an openable treatment door; an inner upper part of the discharge cavity is provided with a storage tank for storing thermoplastic rubber; a bottom of the storage tank is provided with a storage temperature sensor and a storage temperature compensator; a side bottom of the storage tank is provided with a liquid discharge pipe with a liquid discharge valve; a rotating plate is disposed below the liquid discharge pipe; the rotating plate includes one end located below the openable treatment door and forming a clearance fit with an inner wall of the discharge cavity and another end fixed in the discharge cavity via a rotating shaft; an end of the rotating shaft is connected to a rotating motor; a guide plate is disposed in the discharge cavity below the rotating plate; a side wall of the discharge cavity at a tail end of the guide plate coincides with the side wall of the drill string; and an openable discharge door is disposed at the side wall of the discharge cavity at the tail end of the guide plate.

Preferably, the intelligent treatment device for downhole gas invasion while drilling further includes a processor, where the processor is connected to the water pump, the liquid level sensor, the collection chamber pressure sensor, the liquid valve, the gas check valve, the light emitter, the light detector, the light converters, the detection chamber temperature sensor, the detection chamber pressure sensor, the detection chamber temperature compensator, the gas pump, the conveyor belt, the adsorption temperature sensor, the adsorption pressure sensor, the adsorption temperature compensator, the openable storage door, the openable treatment door, the storage temperature sensor, the storage temperature compensator, the liquid discharge valve, the rotating motor, and the openable discharge door.

Preferably, the processor is provided with a remote communication module; and the remote communication module is connected to a surface control unit.

Preferably, the semi-permeable membrane is a polydimethylsiloxane semi-permeable membrane.

Preferably, the light emitter is configured to emit infrared light with a wavelength of 3.31 μm, so as to detect a hydrocarbon at 25-30° C.

Preferably, the light emitter is configured to emit ultraviolet light with a wavelength of 275 nm, so as to detect hydrogen sulfide at 28-30° C.

Preferably, the alkaline solution is a sodium hydroxide solution, a sodium carbonate solution, or ammonia water; and the gas desiccant is solid sodium hydroxide, hydrated lime, or soda lime.

The present disclosure has the following beneficial effects:

(1) In the present disclosure, the semi-permeable membrane features high hydrophobicity, thermal stability, and high permeability. The water discharged from the water storage chamber expels the gas, reducing the pressure in the gas collection chamber, thereby increasing the pressure difference between the inner and outer sides of the semi-permeable membrane, and effectively improving the adsorption collection of the invading gas. Meanwhile, the water discharged from the water storage chamber improves the flow efficiency of the invading gas.

(2) The light converter converts the light emitted by the light emitter and received by the light detector, achieving diverse detection of hydrocarbons and hydrogen sulfide. The optical lens assembly extends the optical path, thereby improving the absorption degree of the detected gas to the light and improving detection precision and accuracy. The detection chamber temperature compensator provides a suitable temperature for the absorption of the gas to the light, thereby improving detection efficiency.

(3) The chemical absorption method absorbs hydrogen sulfide in the invading gas through the alkaline solution. After the hydrogen sulfide is treated, the active solid adsorbs hydrocarbons. After the hydrocarbons are adsorbed, thermoplastic rubber seals and coats the adsorbing active solid. The coated hydrocarbons are discharged into the drilling fluid and are circulated to the surface with the drilling fluid. A desorption experiment can be performed on the saturated active solid on the surface, thereby accurately analyzing the composition and content of the downhole hydrocarbons.

(4) The processor is connected to various sensors and a control terminal to achieve intelligent treatment on downhole gas invasion. Meanwhile, the communication module achieves the interaction with a control terminal.

The present disclosure integrates the collection system, detection system, and treatment system for the downhole invading gas. When downhole gas invasion occurs, the present disclosure can effectively collect the invading gas, and achieve detection and treatment of hydrogen sulfide and hydrocarbons in the invading gas.

Figure 1:
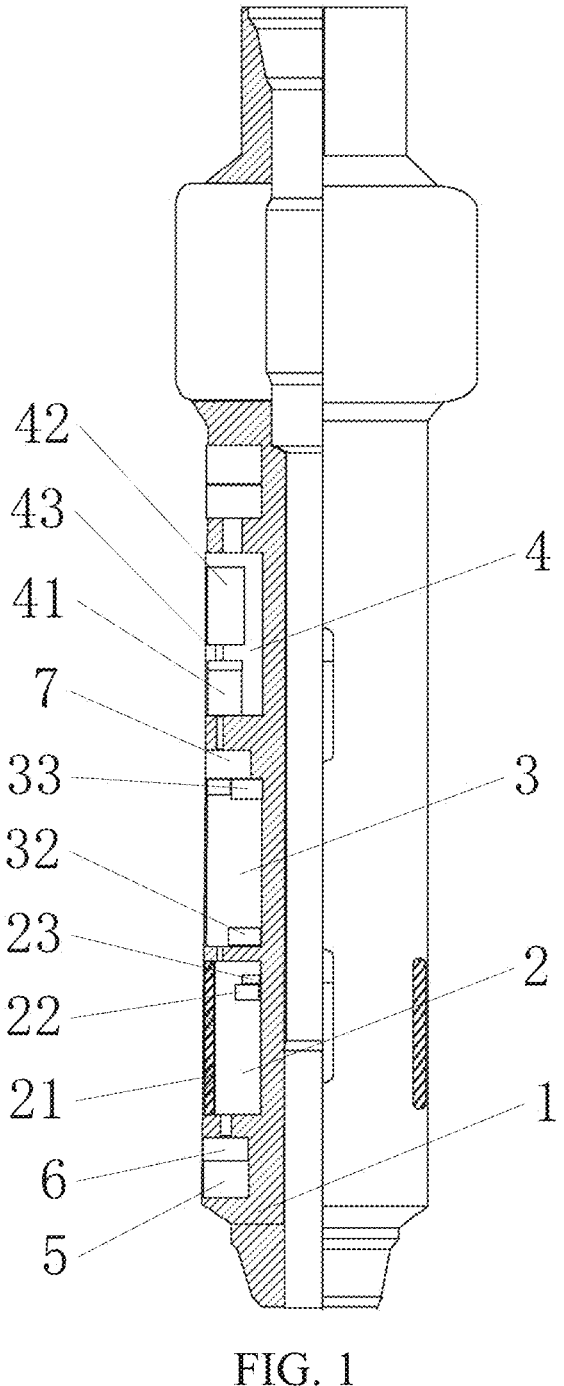
FIG. 1 is a structural diagram of the present disclosure.
Figure 2:
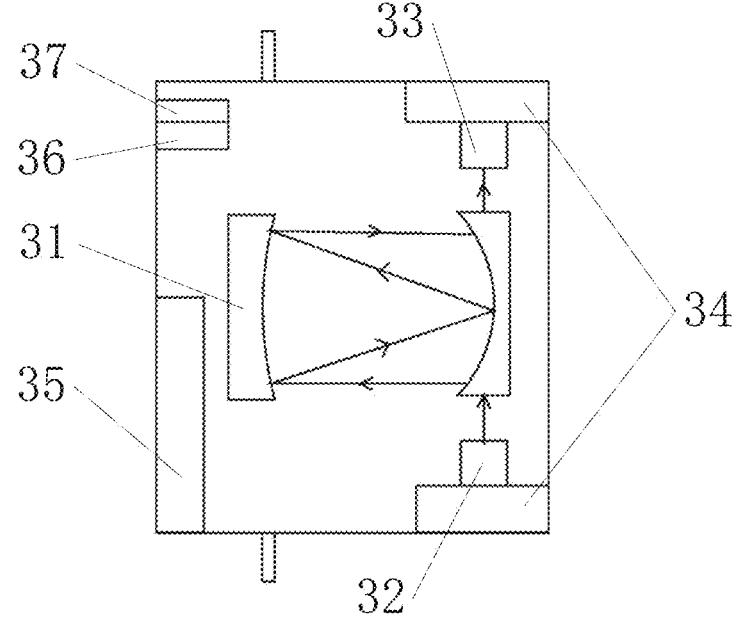
FIG. 2 is an internal structural diagram of a gas detection chamber in the present disclosure.
Figure 3:
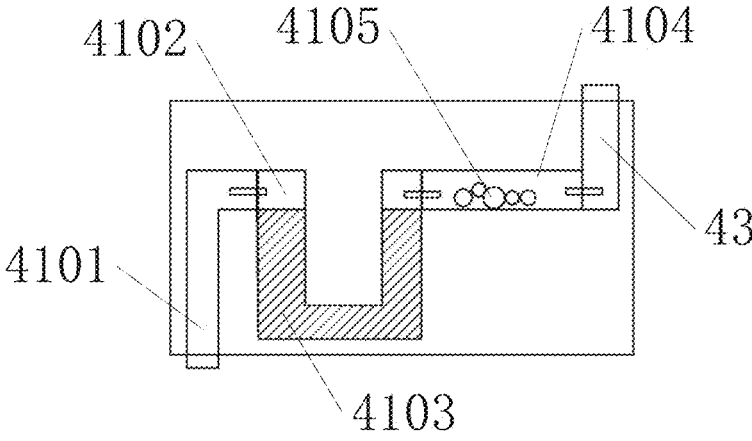
FIG. 3 is an internal structural diagram of a hydrocarbon treatment chamber of the gas treatment chamber in the present disclosure.
Figure 4:
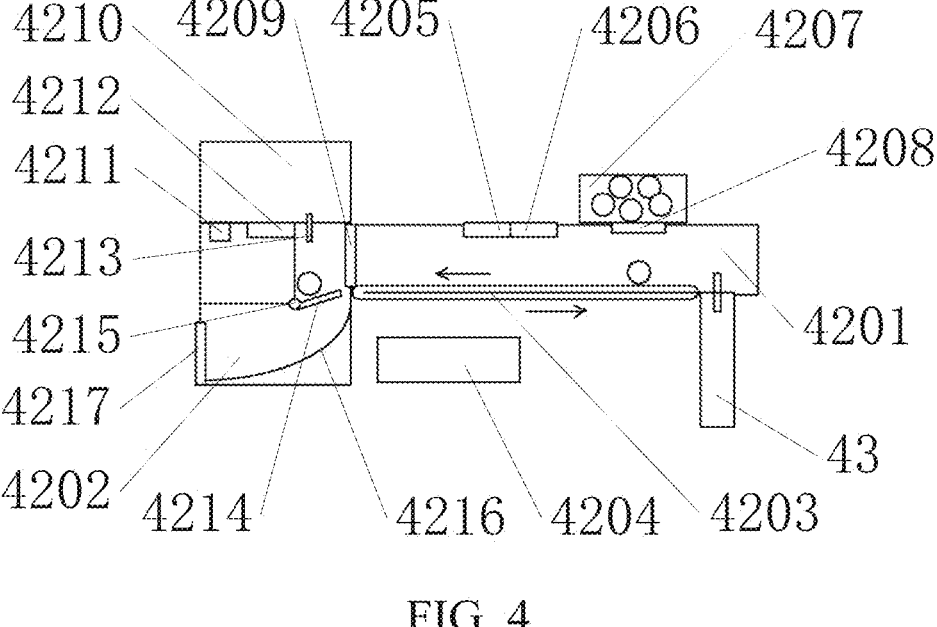
FIG. 4 is an internal structural diagram of a hydrogen sulfide treatment chamber of the gas treatment chamber in the present disclosure.

Reference Numerals: 1. drill string; 2. gas collection chamber; 3. gas detection chamber; 4. gas treatment chamber; 5. water storage chamber; 6. water pump; 7. gas pump; 21. semi-permeable membrane; 22. liquid level sensor; 23. collection chamber pressure sensor; 31. optical lens assembly; 32. light emitter; 33. light detector; 34. light converter; 35. detection chamber temperature compensator; 36. detection chamber temperature sensor; 37. detection chamber pressure sensor; 41. hydrogen sulfide treatment chamber; 42. hydrocarbon treatment chamber; 43. connecting gas pipe; 4101. inlet pipe; 4102. U-shaped pipe; 4103. alkaline solution; 4104. drying pipe; 4105. gas desiccant; 4201. treatment passage; 4202. discharge cavity; 4203. conveyor belt; 4204. adsorption temperature compensator; 4205. adsorption temperature sensor; 4206. adsorption pressure sensor; 4207. adsorption solid storage cavity; 4208. openable storage door; 4209. openable treatment door; 4210. storage tank; 4211. storage temperature sensor; 4212. storage temperature compensator; 4213. liquid discharge pipe; 4214. rotating plate; 4215. rotating shaft; 4216. guide plate; and 4217. openable discharge door.

DETAILED DESCRIPTION OF THE EMBODIMENTS

The present disclosure is described in further detail below with reference to the drawings and specific embodiments.

Embodiment

As shown in FIG. 1, FIG. 2, FIG. 3, and FIG. 4, an intelligent treatment device for downhole gas invasion while drilling disposed in this embodiment includes drill string 1. An inner end of the drill string 1 close to a drill bit is provided with gas collection chamber 2, gas detection chamber 3, and gas treatment chamber 4 that are sealed and connected in sequence from bottom to top through a gas pipe.

A side wall of the gas collection chamber 2 coincides with a side wall of the drill string 1, and is provided with an inlet window. The inlet window is provided with multiple support rods arranged horizontally and vertically. The support rods are configured to support and fix semi-permeable membrane 21, such that the semi-permeable membrane 21 completely seals and covers the inlet window. The semi-permeable membrane 21 is a polydimethylsiloxane semi-permeable membrane with high hydrophobicity, thermal stability, and high permeability. An upper part of the gas collection chamber 2 is provided with liquid level sensor 22 and collection chamber pressure sensor 23. Water storage chamber 5 is disposed below the gas collection chamber 2 in the drill string 1. The water storage chamber 5 is connected to the gas collection chamber 2 through water pump 6 and a liquid valve. In this embodiment, a top of the water storage chamber 5 is connected to a bottom of the gas collection chamber 2 through the water pump 6. The water pump 6 includes a water inlet communicating with the water storage chamber 5 and a water outlet communicating with the gas collection chamber 2. The liquid valve is disposed at a side of the water pump 6. Two ends of the liquid valve communicate with the top of the water storage chamber 5 and the bottom of the gas collection chamber 2, respectively.

Before the drill string goes downhole, the water storage chamber 5 is filled with water. A gas check valve between the gas collection chamber 2 and the gas detection chamber 3 is opened, and the water pump 6 is started to pump water from the water storage chamber 5 into the gas collection chamber 2. Water injection is stopped when a water level reaches the liquid level sensor 22. Injecting water into the gas collection chamber 2 is to expel the gas from the gas collection chamber 2. Then the drill string 1 goes downhole. The gas check valve between the gas collection chamber 2 and the gas detection chamber 3 is closed. A drilling fluid is injected downhole, such that the gas collection chamber 2 is submerged in the drilling fluid. The drilling fluid is disposed outside the semi-permeable membrane 21 filled with the water. The liquid valve is opened, such that the water flows back into the water storage chamber 5 under gravity. The pressure at an inner side of the semi-permeable membrane 21, i.e., inside the gas collection chamber 2, decreases, increasing a pressure difference between the outer and inner sides of the semi-permeable membrane 21. In case gas invasion occurs during drilling, the gas invades the drilling fluid. Due to the pressure difference between the two sides of the semi-permeable membrane 21, the invading gas in the drilling fluid is adsorbed to a surface of the semi-permeable membrane 21, and diffuses into the semi-permeable membrane 21 under the pressure difference, thereby entering the gas collection chamber 2. Since the pressure of the drilling fluid at the outer side of the semi-permeable membrane 21 is much greater than the pressure at the inner side of the gas collection chamber 2, even after a certain amount of gas is collected in the gas collection chamber 2, the pressure in the gas collection chamber 2 is still lower than the pressure at the outer side of the semi-permeable membrane 21. This only slows down the rate of gas passing through the semi-permeable membrane 21 into the gas collection chamber 2.

The gas check valve is disposed on the gas pipe between the top of the gas collection chamber 2 and the bottom of the gas detection chamber 3. When the collection chamber pressure sensor 23 detects that the pressure reaches a preset threshold, the gas check valve between the gas collection chamber 2 and the gas detection chamber 3 is opened. Meanwhile, the water pump 6 is operating to inject the water from the water storage chamber 5 into the gas collection chamber 2. The pressure in the gas collection chamber 2 increases due to water injection, such that the gas collected in the gas detection chamber 3 quickly enters the gas detection chamber 3 through the gas check valve. It is specifically noted that the pressure after the gas collected in the gas collection chamber 2 reaches the threshold plus the pressure increase from water injection is still much less than the pressure caused by the drilling fluid at the outer side of the semi-permeable membrane 21. Therefore, when the gas check valve is opened, the collected gas quickly enters the gas detection chamber 3 under the pressure of the injected water. By expelling the gas via water injection, the gas is delivered to the gas detection chamber 3 through the gas check valve. The design solves the problem of low gas mobility due to low gas concentration, which causes untimely and inaccurate gas detection. The water displacement method reasonably utilizes the high hydrophobicity of the semi-permeable membrane 21 made of polydimethylsiloxane.

An inner middle part of the gas detection chamber 3 is provided with optical lens assembly 31. Light emitter 32 is disposed below the optical lens assembly 31, and light detector 33 is disposed above the optical lens assembly. The optical lens assembly 31 in this embodiment includes two lenses arranged opposite each other. The light emitter 32 is disposed directly below one of the two lenses, and the light detector 33 is disposed directly above the one of the two lenses. The light emitter 32 and the light detector 33 are respectively connected to light converters 34. Light emitted by the light emitter 32 is repeatedly reflected by the two optical lenses and then received by the light detector 33. The gas detection chamber 3 is internally provided with detection chamber temperature compensator 35, detection chamber temperature sensor 36, and detection chamber pressure sensor 37.

When the invading gas collected in the collection chamber is delivered to the gas detection chamber 3, a gas check valve between the gas detection chamber 3 and the gas treatment chamber 4 is closed. The main components in the invading gas include hydrogen sulfide and hydrocarbons. To improve the detection efficiency of hydrogen sulfide and hydrocarbons, the detection chamber temperature compensator 35 adjusts and controls the temperature in the gas detection chamber 3 to 25-30° C. The light converter 34 converts the light emitted by the light emitter 32 and received by the light detector 33 to infrared light with a wavelength of about 3.31 μm. The hydrocarbons in the gas detection chamber 3 absorb the infrared light to the greatest extent at the suitable temperature of 25° C.-30° C. Therefore, the optical lens assembly 31 effectively extends the optical path, i.e., increases the absorption degree of the hydrocarbons to the infrared light. The light detector 33 finally receives the infrared light absorbed by the hydrocarbons. Thus, the absorption rate of the infrared light is detected, thereby determining the concentration of hydrocarbons. Similarly, after hydrocarbon detection is completed, the detection chamber temperature compensator 35 adjusts the temperature in the gas detection chamber 3 to 28-30° C. The light converter 34 converts the light emitted by the light emitter 32 and received by the light detector 33 to ultraviolet light with a wavelength of about 275 nm. The light detector 33 detects the absorption rate of the ultraviolet light, thereby determining the concentration of hydrogen sulfide. The detection chamber temperature compensator 35 provides suitable absorption temperatures for hydrogen sulfide and hydrocarbons, effectively improving the detection efficiency of hydrogen sulfide and hydrocarbons. The light converter 34 enables the gas detection chamber 3 to detect both of hydrocarbons and hydrogen sulfide, achieving diversity in gas detection.

Gas pump 7 and the gas check valve are disposed on the gas pipe between a top of the gas detection chamber 3 and a bottom of the gas treatment chamber 4. As the gas is continuously delivered to the gas detection chamber 3, the detection chamber pressure sensor monitors the pressure in the gas detection chamber 3 in real time. When the pressure reaches a set threshold, the gas pump 7 and the gas check valve between the gas detection chamber 3 and the gas treatment chamber 4 are opened, and the gas in the gas detection chamber 3 is pumped into the gas treatment chamber 4.

The gas treatment chamber 4 is internally provided with hydrogen sulfide treatment chamber 41 and hydrocarbon treatment chamber 42 in sequence from bottom to top.

A side of the hydrogen sulfide treatment chamber 41 is provided with inlet pipe 4101. The inlet pipe 4101 includes an inlet end communicating with a tail end of the gas pipe at the top of the gas detection chamber 3 and an outlet end connected to U-shaped pipe 4102. The U-shaped pipe 4102 is filled with alkaline solution 4103. The alkaline solution 4103 includes a sodium hydroxide solution, a sodium carbonate solution, ammonia water, etc. An end of the U-shaped pipe 4102 away from the inlet pipe 4101 is connected to drying pipe 4104. The drying pipe 4104 is filled with gas desiccant 4105. The gas desiccant includes solid sodium hydroxide, hydrated lime, soda lime, etc. Through the chemical absorption method using the alkaline solution 4103, the hydrogen sulfide in the invading gas is absorbed and treated. After absorption by the alkaline solution 4103, the gas passes through the drying pipe 4104. The gas desiccant 4105 in the drying pipe 4104 removes excess water vapor from the gas.

An end of the drying pipe 4104 away from the U-shaped pipe 4102 is connected to connecting gas pipe 43. An end of the connecting gas pipe 43 away from the drying pipe 4104 extends out of the hydrogen sulfide treatment chamber 41 and extends into the hydrocarbon treatment chamber 42. Thus, the gas after absorption enters the hydrocarbon treatment chamber 42. Since the hydrogen sulfide in the gas has been treated and absorbed, mainly hydrocarbons are left.

The hydrocarbon treatment chamber 42 is internally provided with treatment passage 4201 and discharge cavity 4202 connected to a tail end of the treatment passage 4201. An outlet end of the connecting gas pipe 43 extends into the treatment passage 4201 and is located at a bottom of an end of the treatment passage 4201. The treatment passage 4201 is a sealed cavity. An inner bottom surface of the treatment passage 4201 is provided with conveyor belt 4203. An inner top of the treatment passage 4201 is provided with adsorption temperature sensor 4205 and adsorption pressure sensor 4206. Adsorption temperature compensator 4204 is disposed below the treatment passage 4201. An inner top surface of the treatment passage 4201 is provided with adsorption solid storage cavity 4207. The adsorption solid storage cavity 4207 coincides with a top wall of the treatment passage 4201 and is provided with openable storage door 4208. Active adsorption solid is stored in the adsorption solid storage cavity 4207. The active adsorption solid is palm-based activated carbon. An end of the treatment passage 4201 away from the connecting gas pipe 43 is connected to the discharge cavity 4202, and a connection position is provided with openable treatment door 4209. An inner upper part of the discharge cavity 4202 is provided with storage tank 4210 for storing thermoplastic rubber. The storage tank 4210 is filled with thermoplastic rubber. In this embodiment, the thermoplastic rubber includes tetrafluoroethylene rubber and polyvinyl chloride rubber, etc. A bottom of the storage tank 4210 is provided with storage temperature sensor 4211 and storage temperature compensator 4212. A side bottom of the storage tank 4210 is provided with liquid discharge pipe 4213 with a liquid discharge valve. Rotating plate 4214 is disposed below the liquid discharge pipe 4213. One end of the rotating plate 4214 is disposed below the openable treatment door 4209 and forms a clearance fit with an inner wall of the discharge cavity 4202, and another end of the rotating plate 4214 is fixed in the discharge cavity 4202 through rotating shaft 4215. An end of the rotating shaft 4215 is connected to a rotating motor. Guide plate 4216 is disposed in the discharge cavity 4202 below the rotating plate 4214. A side wall of the discharge cavity 4202 at a tail end of the guide plate 4216 coincides with the side wall of the drill string 1. The side wall of the discharge cavity 4202 at the tail end of the guide plate 4216 is provided with an openable discharge door 4217. The connecting gas pipe 43 delivers the gas into the treatment passage 4201. The openable storage door 4208 is opened, and the active adsorption solid is released. The released active adsorption solid falls on the conveyor belt 4203. The adsorption temperature compensator 4204 is controlled to adjust the temperature in the treatment passage 4201 to 20-40° C., which is conducive to the adsorption of hydrocarbons by the active adsorption solid. Meanwhile, the adsorption pressure sensor 4206 detects the pressure change in the treatment passage 4201 in real time. When the pressure in the treatment passage 4201 no longer decreases, it indicates that the active adsorption solid is saturated, and all hydrocarbons in the treatment passage 4201 are adsorbed by the active adsorption solid. Then the openable treatment door 4209 is opened, and the conveyor belt 4203 is started. The saturated active adsorption solid is delivered to the rotating plate 4214 through the openable treatment door 4209. The rotating plate 4214 is initially horizontal, and the active adsorption solid falls on the surface of the rotating plate 4214. The storage temperature compensator 4212 is activated, and the temperature in the storage tank 4210 is increased to 90-120° C., and the thermoplastic rubber in the storage tank 4210 melts. The liquid discharge valve on the liquid discharge pipe 4213 at the bottom of the storage tank 4210 is opened. Thus, the melted thermoplastic rubber slowly drips through the liquid discharge pipe 4213 onto the surface of the active adsorption solid below, and gradually cools on the surface of the active adsorption solid, thereby forming a dense rubber shell. After cooling is completed, the rotating motor drives the rotating plate 4214 to rotate downward, so the active adsorption solid coated with the dense rubber shell falls downward and is delivered to the openable discharge door 4217 via the guide plate 4216. The openable discharge door 4217 is opened, such that the active adsorption solid coated with the dense rubber shell is discharged out of the drill string 1 into the drilling fluid and circulated to the surface with the drilling fluid. A desorption experiment can be performed on the surface to analyze the composition and content of the downhole hydrocarbons.

Figure 5:
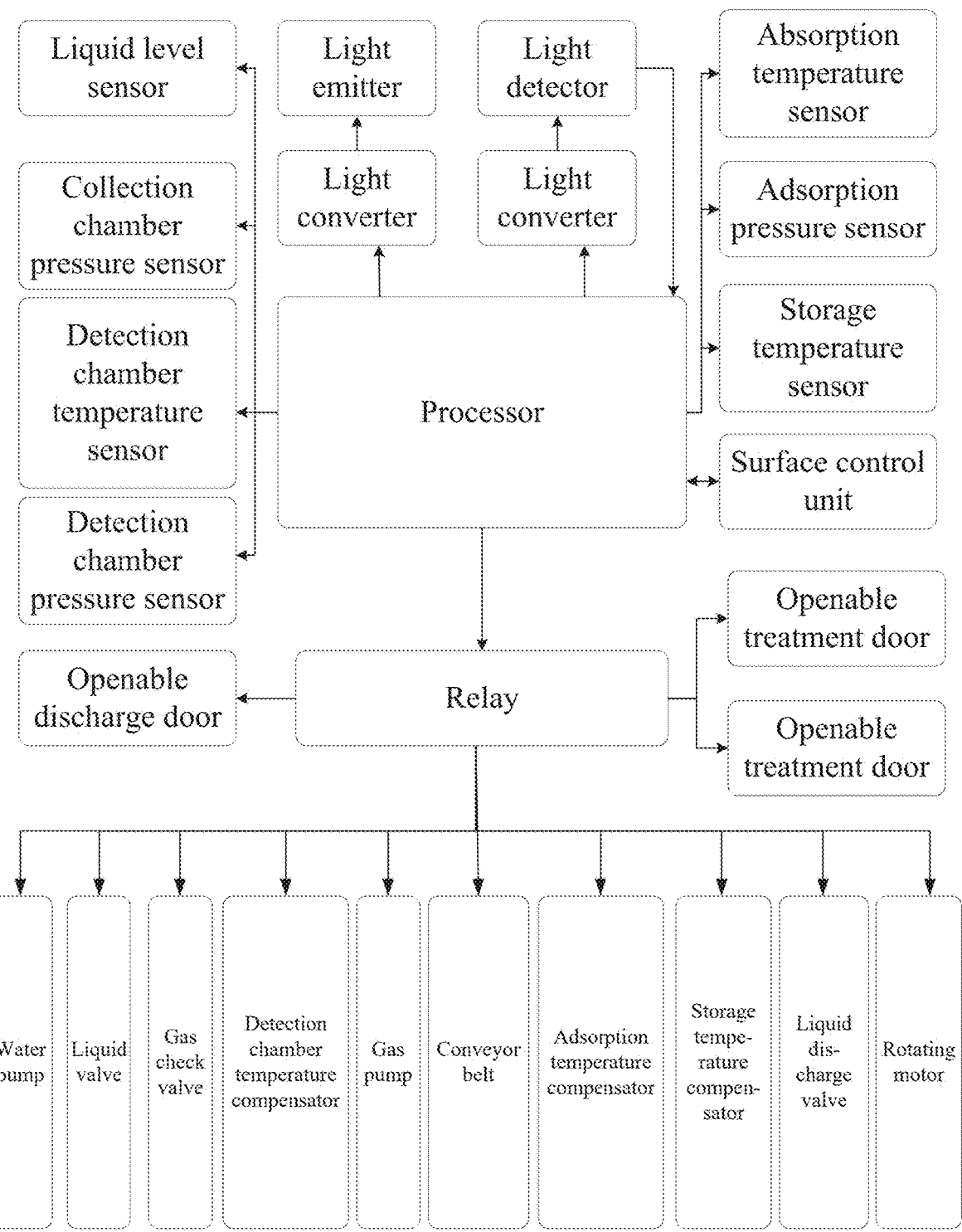
FIG. 5 is a system block diagram of the present disclosure.

As shown in FIG. 5, this embodiment further includes a processor. The processor is provided with a power module, and is connected to the liquid level sensor 22, the collection chamber pressure sensor, the detection chamber temperature sensor 36, the detection chamber pressure sensor 37, the adsorption temperature sensor 4205, the adsorption pressure sensor 4206, the storage temperature sensor 4211, the light emitter 32, the light detector 33, and the light converter 34. The processor is configured to control the water pump 6, the liquid valve, the gas check valve, the detection chamber temperature compensator 35, the gas pump 7, the conveyor belt 4203, the adsorption temperature compensator 4204, the openable storage door 4208, the openable treatment door 4209, the storage temperature compensator 4212, the liquid discharge valve, the rotating motor, and the openable discharge door 4217 through a relay. The processor is provided with a remote communication module, and the remote communication module is connected to a surface control unit.

The above are only preferred implementation manners of the present disclosure, but the protection scope of the present disclosure is not limited thereto. Any modifications and replacements made based on the technical solutions and inventive concepts provided by the present disclosure shall fall within the protection scope of the present disclosure.

What is claimed is:

1. An intelligent treatment device for downhole gas invasion while drilling, comprising: a drill string, wherein an inner end of the drill string close to a drill bit is provided with a gas collection chamber, a gas detection chamber, and a gas treatment chamber that are sealed and connected in sequence from bottom to top via gas pipes;

a side wall of the gas collection chamber coincides with a side wall of the drill string and is provided with an inlet window; the inlet window is covered with a gas-permeable and hydrophobic semi-permeable membrane; a liquid level sensor and a collection chamber pressure sensor are disposed at an inner upper part of the gas collection chamber; a water storage chamber is disposed below the gas collection chamber in the drill string; and the water storage chamber is connected to the gas collection chamber via a water pump and a liquid valve;

the gas pipe between a top of the gas collection chamber and a bottom of the gas detection chamber is provided with a gas check valve; an optical lens assembly is disposed at an inner middle part of the gas detection chamber; a light emitter is disposed below the optical lens assembly, and a light detector is disposed above the optical lens assembly; light emitted by the light emitter passes through the optical lens assembly and is received by the light detector; the light emitter and the light detector are respectively connected to light converters; and a side of the gas detection chamber comprises a lower part provided with a detection chamber temperature compensator and an upper part provided with a detection chamber temperature sensor and a detection chamber pressure sensor;

the gas pipe between a top of the gas detection chamber and a bottom of the gas treatment chamber is provided with a gas pump and a gas check valve; and a hydrogen sulfide treatment chamber and a hydrocarbon treatment chamber are disposed in sequence from bottom to top in the gas treatment chamber;

a side of the hydrogen sulfide treatment chamber is provided with an inlet pipe; the inlet pipe comprises an inlet end communicating with a tail end of the gas pipe and an outlet end connected to a U-shaped pipe; the U-shaped pipe is filled with an alkaline solution; an end of the U-shaped pipe away from the inlet pipe is connected to a drying pipe; the drying pipe is filled with a gas desiccant; an end of the drying pipe away from the U-shaped pipe is connected to a connecting gas pipe; and an end of the connecting gas pipe away from the drying pipe extends out of the hydrogen sulfide treatment chamber and extends into the hydrocarbon treatment chamber;

the hydrocarbon treatment chamber is internally provided with a treatment passage and a discharge cavity; an outlet end of the connecting gas pipe extends into the treatment passage and is located at a bottom of an end of the treatment passage; a bottom surface of the treatment passage is provided with a conveyor belt; an adsorption temperature compensator is disposed below the conveyor belt; an adsorption temperature sensor and an adsorption pressure sensor are disposed on an inner top of the treatment passage; a top surface of the treatment passage is provided with an adsorption solid storage cavity; a bottom of the adsorption solid storage cavity is provided with an openable storage door communicating with an interior of the treatment passage; an end of the treatment passage close to a tail end of the conveyor belt is connected to the discharge cavity, and a connection position is provided with an openable treatment door; an inner upper part of the discharge cavity is provided with a storage tank for storing thermoplastic rubber; a bottom of the storage tank is provided with a storage temperature sensor and a storage temperature compensator; a side bottom of the storage tank is provided with a liquid discharge pipe with a liquid discharge valve; a rotating plate is disposed below the liquid discharge pipe; the rotating plate comprises one end located below the openable treatment door and forming a clearance fit with an inner wall of the discharge cavity and another end fixed in the discharge cavity via a rotating shaft; an end of the rotating shaft is connected to a rotating motor; a guide plate is disposed in the discharge cavity below the rotating plate; a side wall of the discharge cavity at a tail end of the guide plate coincides with the side wall of the drill string; and an openable discharge door is disposed at the side wall of the discharge cavity at the tail end of the guide plate.

2. The intelligent treatment device for downhole gas invasion while drilling according to claim 1, further comprising a processor, wherein the processor is connected to the water pump, the liquid level sensor, the collection chamber pressure sensor, the liquid valve, the gas check valve, the light emitter, the light detector, the light converters, the detection chamber temperature sensor, the detection chamber pressure sensor, the detection chamber temperature compensator, the gas pump, the conveyor belt, the adsorption temperature sensor, the adsorption pressure sensor, the adsorption temperature compensator, the openable storage door, the openable treatment door, the storage temperature sensor, the storage temperature compensator, the liquid discharge valve, the rotating motor, and the openable discharge door.

3. The intelligent treatment device for downhole gas invasion while drilling according to claim 2, wherein the processor is provided with a remote communication module; and the remote communication module is connected to a surface control unit.

4. The intelligent treatment device for downhole gas invasion while drilling according to claim 1, wherein the adsorption solid storage cavity is configured to store an active adsorption solid; and the active adsorption solid is palm-based activated carbon.

5. The intelligent treatment device for downhole gas invasion while drilling according to claim 4, wherein the semi-permeable membrane is a polydimethylsiloxane semi-permeable membrane.

6. The intelligent treatment device for downhole gas invasion while drilling according to claim 5, wherein the light emitter is configured to emit infrared light with a wavelength of 3.31 μm, so as to detect a hydrocarbon at 25° C.-30° C.

7. The intelligent treatment device for downhole gas invasion while drilling according to claim 5, wherein the light emitter is configured to emit ultraviolet light with a wavelength of 275 nm, so as to detect hydrogen sulfide at 28° C.-30° C.

8. The intelligent treatment device for downhole gas invasion while drilling according to claim 1, wherein the alkaline solution is a sodium hydroxide solution, a sodium carbonate solution, or ammonia water; and the gas desiccant is solid sodium hydroxide, hydrated lime, or soda lime.

9. The intelligent treatment device for downhole gas invasion while drilling according to claim 2, wherein the alkaline solution is a sodium hydroxide solution, a sodium carbonate solution, or ammonia water; and the gas desiccant is solid sodium hydroxide, hydrated lime, or soda lime.

10. The intelligent treatment device for downhole gas invasion while drilling according to claim 3, wherein the alkaline solution is a sodium hydroxide solution, a sodium carbonate solution, or ammonia water; and the gas desiccant is solid sodium hydroxide, hydrated lime, or soda lime.

11. The intelligent treatment device for downhole gas invasion while drilling according to claim 4, wherein the alkaline solution is a sodium hydroxide solution, a sodium carbonate solution, or ammonia water; and the gas desiccant is solid sodium hydroxide, hydrated lime, or soda lime.

12. The intelligent treatment device for downhole gas invasion while drilling according to claim 5, wherein the alkaline solution is a sodium hydroxide solution, a sodium carbonate solution, or ammonia water; and the gas desiccant is solid sodium hydroxide, hydrated lime, or soda lime.

13. The intelligent treatment device for downhole gas invasion while drilling according to claim 6, wherein the alkaline solution is a sodium hydroxide solution, a sodium carbonate solution, or ammonia water; and the gas desiccant is solid sodium hydroxide, hydrated lime, or soda lime.

14. The intelligent treatment device for downhole gas invasion while drilling according to claim 7, wherein the alkaline solution is a sodium hydroxide solution, a sodium carbonate solution, or ammonia water; and the gas desiccant is solid sodium hydroxide, hydrated lime, or soda lime.

* * * * *